W. B. WEST.
CONVERTIBLE VEHICLE BODY.
APPLICATION FILED JAN. 22, 1915.
1,170,714.
Patented Feb. 8, 1916.
2 SHEETS—SHEET 1.
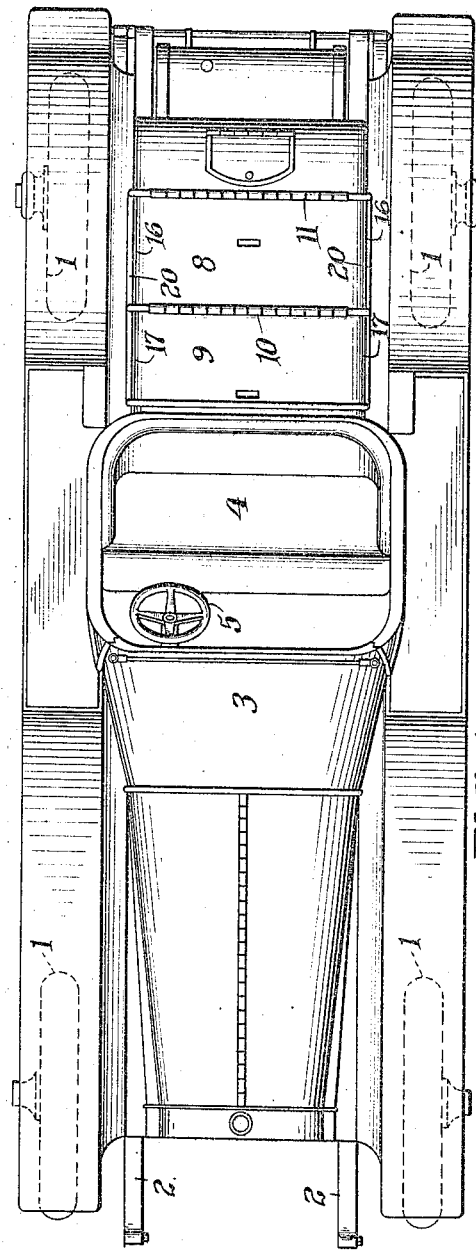
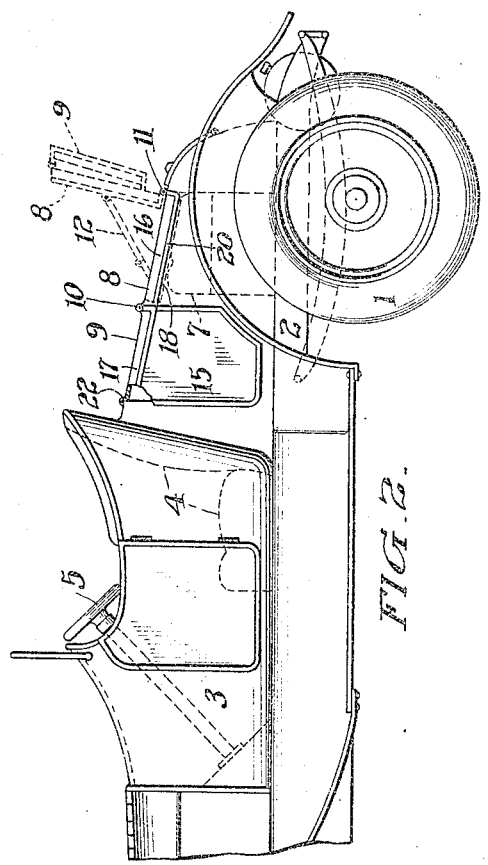
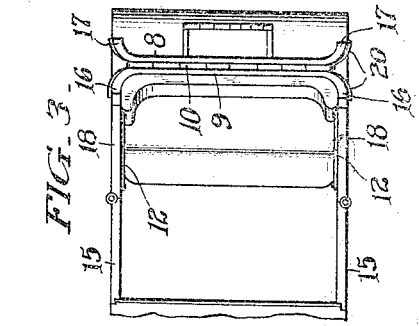
WITNESSES
C. E. Kleinfelder
Daniel Webster, Jr.
INVENTOR
William B. West
BY Cyrus N. Anderson
ATTORNEY

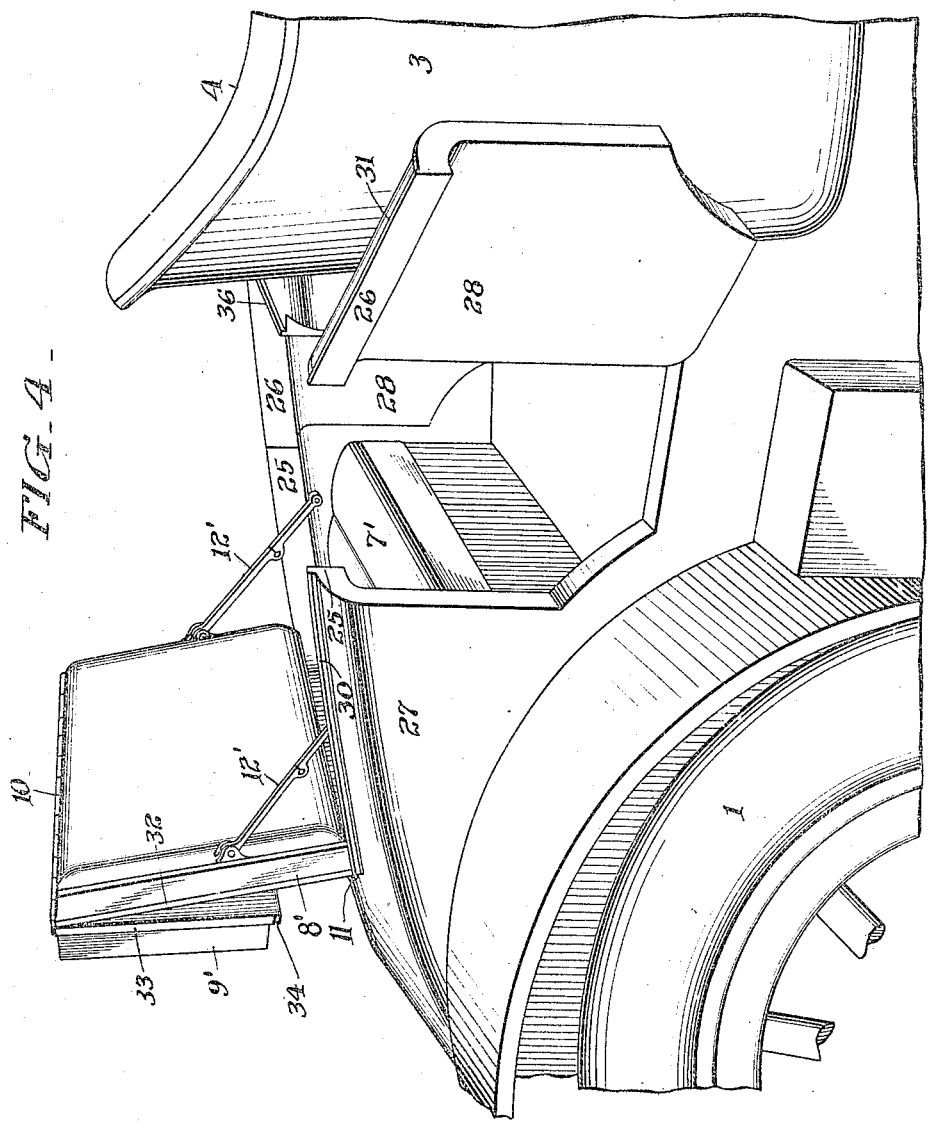

UNITED STATES PATENT OFFICE.

WILLIAM B. WEST, OF PHILADELPHIA, PENNSYLVANIA.

CONVERTIBLE VEHICLE-BODY.

1,170,714.  Specification of Letters Patent.  Patented Feb. 8, 1916.

Application filed January 22, 1915. Serial No. 3,681.

*To all whom it may concern:*

Be it known that I, WILLIAM B. WEST, a citizen of the United States, and a resident of the city of Philadelphia, in the county of Philadelphia and State of Pennsylvania, have invented certain new and useful Improvements in Convertible Vehicle - Bodies, of which the following is a specification.

My invention has for its object to provide a body for a vehicle, such as an automobile, having, in addition to the usual seat, a concealed rear seat the back portion of which is so arranged and combined with the body that when the seat is not in use and the back is in closed position said seat is completely concealed and is not apparent to an observer of the vehicle, the upper edges in the top of the body in rear of the front seat being inclined upwardly and forwardly as usual in the type of car shown.

A still further object is to so construct the seat that the back portion thereof and a part flexibly connected thereto constitute a part of the body when the seat is in collapsed position.

Another object of my invention is to so construct and relate the parts of the body which are associated with and form part of the seat structure to other parts of the body structure that when they are in such relation to each other that the presence of the seat is concealed a water tight closure between the adjoining parts is formed.

Other objects and advantages of my invention will be referred to in the detailed description thereof which follows or will be apparent therefrom.

In order that my invention may be more readily comprehended and understood reference should be had to the accompanying drawings in which I have illustrated convenient and preferred forms of embodiment thereof, but it will be understood that changes in the details of construction may be made within the scope of the claim without departing from my invention.

In the drawings:—Figure 1 is a top plan view of an automobile having a body provided with my invention; Fig. 2 is a side elevation of the same, a portion being broken away to show in section a detail of construction; Fig. 3 is a top plan view of the rear part of the automobile with the back of the seat in raised position; and Fig. 4 is a perspective view of a portion of an automobile illustrating a modified construction embodying my invention.

Referring to the drawings, 1 designates the wheels of an automobile and 2 the side members of the chassis or under frame for supporting the body 3 and other parts of the car. The body 3 is provided with the usual seat 4 occupied by the operator who controls the car through the steering wheel 5. In rear of the seat 4 I have provided a seat 7 which normally, or when not in use, is concealed by the top part of the body of the car in rear of the back portion of the seat 4. The portions 8 and 9 of the top of the car body are flexibly connected to each other by a hinge connection 10. The portion 8 is flexibly connected at its rear edge by a hinge connection 11 to the stationary part of the top of the car body in general alinement with the rear edge of the seat 7. Normally or when not in use the parts 8 and 9 occupy the position shown in Fig. 1 and in full lines in Fig. 2 in which position the presence of the seat 7 is not apparent to an observer of the car.

When the parts 8 and 9 are lifted up and folded back into the positions in which they are illustrated in dotted lines in Fig. 2 of the drawings the part 8 constitutes the back of the seat against which a person using the seat rests. The said portions are held in raised position by means of the toggle levers 12. The portion 9 is turned about its hinge connection 10 so that the top surface thereof faces forward and rests against the top side of the part 8 which faces to the rear when the same is in raised position as indicated in dotted lines in Fig. 2.

The sides of the car are provided with doors one of which is shown at 15 in Fig. 2 of the drawings. The pivoted and flexibly connected parts 8 and 9 of the drawings are provided with downwardly extending flange-like parts on their opposite side edges as indicated at 16 and 17. These downwardly extending flange-like portions fit against the top edges of the portions 18 of the sides of the car and also the top edges of the doors 15 (one on each side of the car). In order to insure a water-tight joint between these downwardly extending flange-like portions 16 and 17 and the abutting edges of the side portions 18 of the body of the car and of the doors 15 I have provided a narrow extension 20 along the lower edges of the flange-like extensions 16 and 17 of the parts 8 and 9. This extension overlaps the upper edges of the side portions 18 of the body of the car and the doors 15. Extending across the top of the body of the car and adjacent to the front edge of the opening which is normally closed by the parts 8 and 9 I have provided a ridge or bead over which a grooved extension 22 on the forward edge of the part 9 is adapted to fit when the latter is in closed position. It will thus be seen that when the parts 8 and 9 are in closed position, the doors 15 being also closed, the interior of the rear portion of the car within which the seat 7 is situated is entirely protected against water, dust, etc.

It may be noted that the flange-like parts 16 and 17 appear as though they were continuations of the opposite side portions 18 of the body of the car and of the doors 15 so that when the portions 8 and 9 are in closed position the car body is very neat in appearance, giving no objectionable indication that it is a convertible car body; that is to say, a car body provided with a concealed rear seat which may be used or not as desired.

By extending the opposite edges of the parts 8 and 9 downwardly to form the flange-like extensions 16 and 17 as illustrated in Figs. 1, 2 and 3, I provide means for forming a seat back having projecting flange portions at the opposite ends of the seat which serve as supports for one side or the other of the person using the seat 7. A seat having such a back is very restful and therefore very desirable.

In Fig. 4 of the drawings I have shown a modified construction in which parts 8' and 9' are not provided with extensions 16 and 17 as in Fig. 2. In the construction shown in said Fig. 4 I have provided extensions indicated at 25 and 26 upon the upper edge portions 27 of the car body and of the doors 28. The upper sides of these extensions 25 and 26 are provided with ridges or beads 30 and 31 which extend along the edges, which ridges or beads are adapted to project into grooved extending parts 32 and 33 upon the opposite edges of the hinged and flexibly connected parts 8' and 9'. The forward edge of the part 9' is also provided with a grooved extended part 34 which is adapted to fit upon and over a ridge or bead-like projection 36 which is provided along the top of the car body at the front edge of the opening which is closed by the parts 8' and 9'. It is apparent that when the doors 28 are closed and the parts 8' and 9' are in closed position the seat 7' is completely and thoroughly protected from water, dust, etc.

The part 8' is held upright in position to be used as the back part of the seat 7' by means of the toggle levers 12'.

In both forms of construction the hinged members 8, 9, 8' and 9' when closed cooperate with the side portions and doors of the body of the car so as to give the appearance of a continuous body structure. The result is that a neat and sightly appearance is presented which is a very important feature and factor in the construction of vehicle bodies, particularly those for automobiles.

I claim:—

A vehicle body having an opening in the top of its rear portion, a seat situated in the rear part of said opening, openings in the sides of the said body in front of said seat, horizontally swinging doors for closing said openings, flexibly connected parts for opening and closing the opening in the top of the automobile body, one of the said parts having hinged connection with the rear edge of the opening in the top of said body, and constituting the back of the seat when in open position, means for holding the said part in open position, and the opposite ends of the part constituting the back when in raised position contacting with the opposite side edges of the opening in the top of the body when in closed position and the opposite ends of the other member when in closed position engaging the upper edges of the doors for closing the side opening.

In testimony that I claim the foregoing as my invention I have hereunto signed my name this 19th day of January, A. D. 1915.

WILLIAM B. WEST.

In the presence of—
C. E. KLEINFELDER,
C. H. WISSMANN.